Nov. 24, 1964    H. F. PFEIFFER    3,157,955
TEACHING MACHINE
Filed June 29, 1961    2 Sheets—Sheet 1
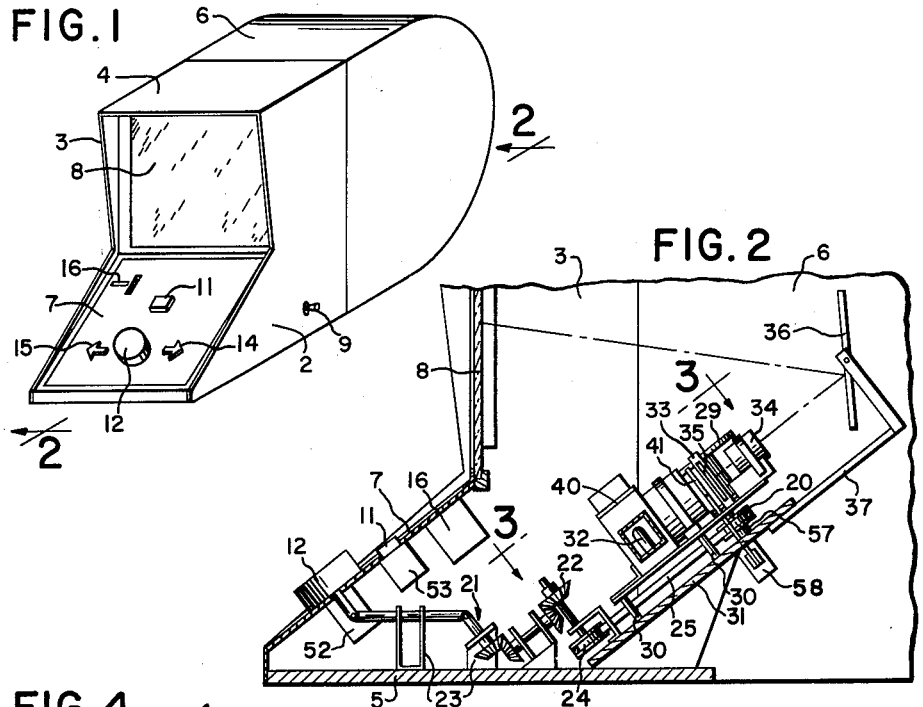
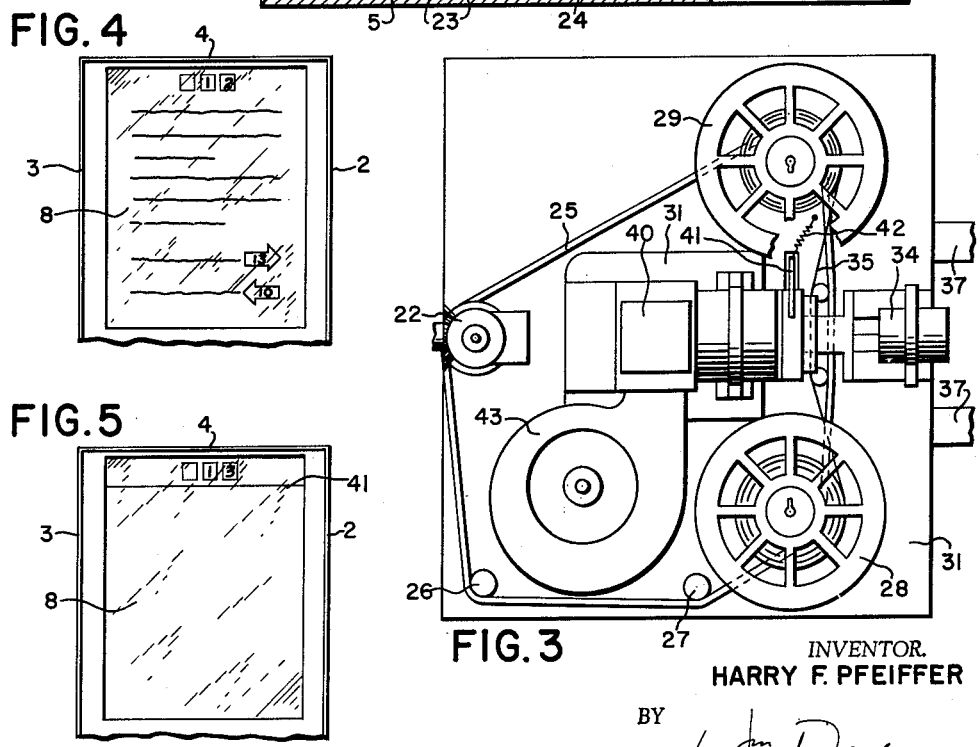
INVENTOR.
HARRY F. PFEIFFER
BY
ATTORNEY

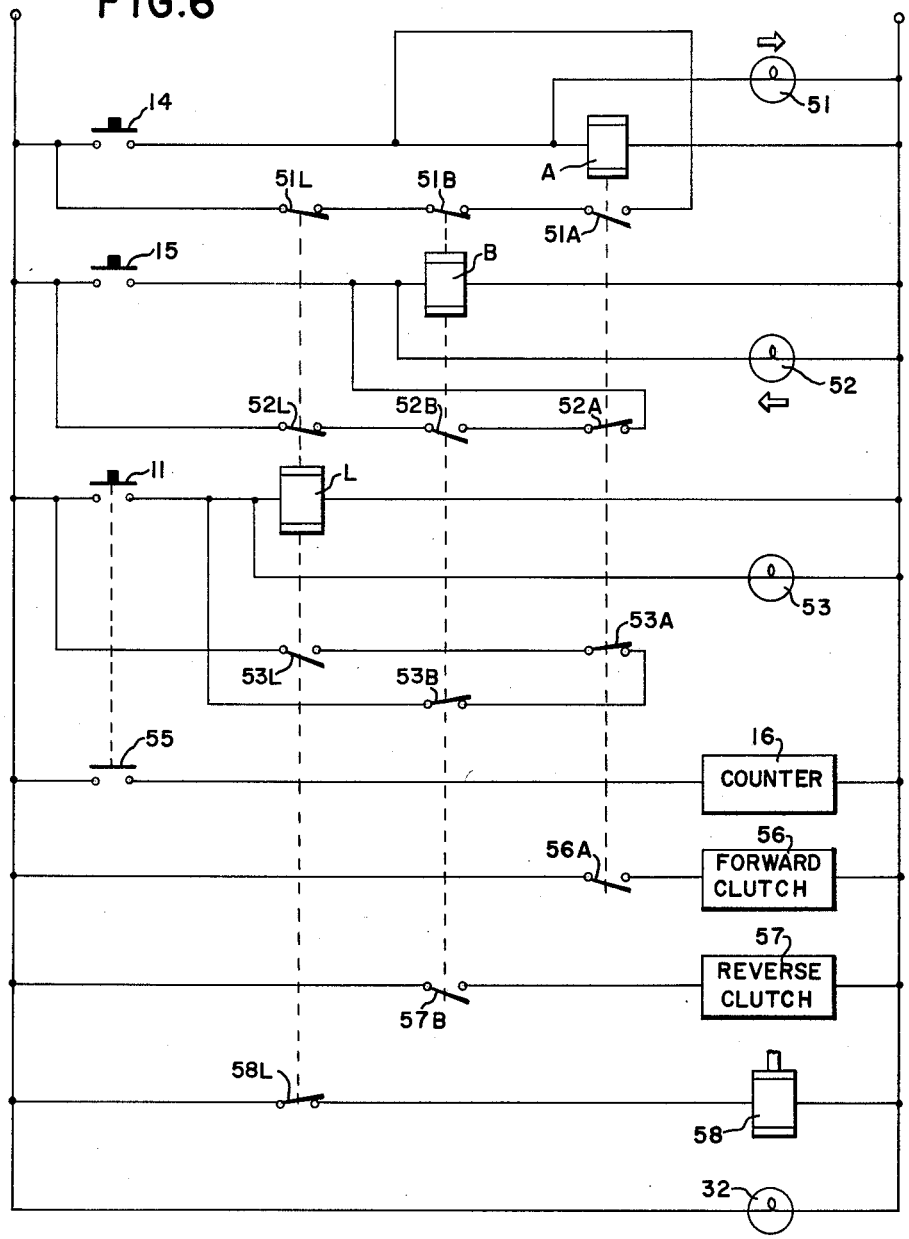

United States Patent Office 3,157,955
Patented Nov. 24, 1964

3,157,955
TEACHING MACHINE
Harry F. Pfeiffer, Palo Alto, Calif., assignor to Varian Associates, Palo Alto, Calif., a corporation of California
Filed June 29, 1961, Ser. No. 120,697
6 Claims. (Cl. 35—9)

The present invention relates in general to educational devices, and more particularly, to a simplified teaching machine whereby the learner has complete control of the device.

The simplified teaching machine of the present invention provides the same learning capability as the more expensive and complex teaching machines. Basically, the present machine provides a visual stimulus, requires a response based upon the learner's understanding of the information, and then provides knowledge of results with regard to the correctness of his answer. This learning cycle is similar to the majority of teaching machines invented to date. The execution of this cycle in terms of mechanical and electrical concepts varies considerably and allows latitude of design.

The present invention accomplishes these objectives in a manner believed most beneficial to the learner, and in a manner that will allow a distinct economical advantage over similar machines. This invention allows the learner to have complete control over the operation of the machine. Through this, the learner develops a rapport between himself and the machine instead of feeling dominated by the omnipotence of the device. This invention uses no complex memory or logic circuitry as do most other devices of the same accomplishment. In the present invention, the learner performs the memory function in a manner that will not in any way detract from the learning process. Through the simplicity of the operation of this device, the learner's attention will not be drawn to any complex machine function. In essence, the simplicity of this teaching machine is its most outstanding characteristic.

The teaching machine of the present invention operates at an extremely low speed thereby eliminating the need for all but the simplest of maintenance schedules. There will be no scratching or breakage of the film, for example, 35 mm., containing the visual stimulus. Similarly, through this feature, the design of all mechanical components, using standard practices, will automatically introduce a high degree of reliability.

The object of the present invention is to provide a simplified teaching machine which will present instructional material and allow the learner to make a response with complete control of the machine.

The main feature of the present invention is the provision of a blocking shutter which prevents the student from viewing intervening material when moving from one position within the program to the next. This feature also allows unlimited programming of the instructional material.

Another feature of the present invention is the use of a scoring device which may be used to evaluate the proficiency of the student.

These and other features of the present invention will become apparent upon a perusal of the following specification and drawings wherein, FIG. 1 is a perspective view of the teaching machine of the present invention, FIG. 2 is a fragmentary cross sectional view of the teaching machine taken from along line 2—2 of FIG. 1 in the direction of the arrows.

FIG. 3 is an interior view of the teaching machine taken along line 3—3 of FIG. 2 in the direction of the arrows, FIG. 4 is a view of the viewing screen with the blocking shutter in the open position, FIG. 5 is a view of the viewing screen with the blocking shutter in the closed position, and FIG. 6 is a wiring diagram showing the significant electrical connections of the present invention.

Referring now to the drawings and more particularly to FIGS. 1, 2 and 3, the mechanical and optical portions of the machine are housed within a suitable cover, including spaced side frame panels 2 and 3, top panel 4, base 5 and back cover 6. A console or control panel 7 is rigidly mounted at an incline in the front of the machine. A translucent screen 8 is mounted above control panel 7 at a near vertical incline in order to provide an easily visible surface for the student facing the teaching machine and is set inwardly into the housing to provide a darkened viewing area. An on-off switch 9 is mounted, for example, on side panel 2 to provide easy access for the student.

The operating controls for the teaching machine include view button 11, film advance control knob 12, forward and reverse control buttons 14 and 15, and a counter 16. Suitable lights are positioned within the control panel 7 beneath the view button 11 and control buttons 14 and 15 to indicate which button is in control of the machine.

Film advance control knob 12 is connected through a direct drive coupling 21 including a series of drive shafts and gears mounted on base support members 23 to a timing gear 22. Timing gear 22 is counted on a platform 31 which is mounted on base 5, and at an angle thereto. Timing gear 22 is connected to a sprocket member 24 which acts as the drive wheel for a timing belt drive 25 and provides one support for said belt. A pair of idler rollers 26 and 27 are provided to maintain proper tension on timing belt 25 and to direct timing belt 25 around obstructing portions of the operating mechanism. Timing belt drive 25 drives a film supply reel 28 and take-up reel 29. A reverse clutch (not shown) is provided in gear 20 to operate the take-up reel 29 when the reverse control button 15 is depressed. Film supply reel 28 has an identical drive gear and forward clutch connected in the same manner. The forward clutch for the supply reel 28 is operated by forward control button 14, in a manner to be subsequently explained.

Suitably secured by mounts 30 on platform 31 is the light projector and optical system of the teaching machine. The light projector is a standard type and comprises a light source 32, a spherical reflector, (not shown) and a light condensing lens system (not shown) all in a suitable container 40. A film gate 33 is provided to correctly position the film 35 with reference to the light source 32. An objective lens 34 is provided to present clear focusing of the film subject matter. The film 35 is stored on the reels 28 and 29 in the usual manner. A mirror 3 is situated at the proper angle on a mounting stand 37 supported by platform 31, to reflect the projected image from the film 35 onto the translucent screen 8. A blocking shutter 41 is provided between film gate 33 and the condensing system to block out the intelligence portion presented on each frame of the film 35 while leaving the frame number exposed. Blocking shutter 41 is biased by a suitable spring 42. A relay and solenoid 58 is provided to maintain blocking shutter 41 in the closed position except when the view button 11 is depressed. A fan 43 is provided for cooling the projector in the usual manner.

FIGS. 4 and 5 show alternative views of the translucent viewing screen 8 seen during operation of the teaching machine. FIG. 4 illustrates, as an example, the page or film frame which carries the frame number "12." The blocking shutter 41 is in the open position, thereby permitting the intelligenc peortion of the film to be presented on translucent screen 8. FIG. 5, on the other hand, shows the translucent screen 8 with the blocking shutter 41 in the closed position and the intelligence portion of film frame numbered "13" blocked out.

Referring now to FIG. 6 there is shown the wiring circuit used for operating the presnet teaching machine. All of the contact switches in the circuit are shown in their unoperated position. The forward control button 14, the reverse control button 15 and the view button 11 each actuate a different relay, A, B and L, respectively. Between each of the buttons 14, 15 and 11 and their respective relays A, B and L is provided a holding circuit for maintaining the individual relays energized when an individual button is depressed. Each holding circuit contains three contacts, contacts 51A, 51B, and 51L for the forward control button holding circuit, contacts 52A, 52B and 52L for the reverse control button holding circuit, and contacts 53A, 53B and 53L for the view button holding circuit, the letters A, B and L for each of these contacts representing the relay which actuates the contact. Normally before a button circuit is energized the holding circuit contact therein which is actuated by the relay therein is open and is then closed by the respective relay when the button is depressed. The other button holding circuits operated by a particular relay are normally closed and upon energization of the particular relay are opened to deenergize the other button circuit relays in the device.

Each of the button circuits 14, 15 and 11 are also provided with a light 51, 52 and 53, respectively, under the button for indication of the circuit being energized.

Also, upon energization relay A closes a contact 56A for actuating a forward clutch 56, relay B closes a contact 57B for actuating a reverse clutch 57 and relay L opens a contact 58L in a line to a blocking shutter relay 58.

Let us assume that the student is viewing frame 12, as seen in FIG. 4. View button 11 (FIG. 6) would be depressed, energizing relay L and illuminating the view light 53 to illuminate the view button. Relay L will close contact 53L, to close the view button holding circuit, open contacts 51L and 52L to open the holding circuits for relays A and B, and open contact 58L, to release the blocking shutter relay 58 thereby allowing the biasing spring 42 to open the shutter. After the student reads the instructional portion presented on the screen 8, a question may then be asked; for example, of the multiple choice type. The student, in FIG. 4, has the choice of selecting the answer associated with either frame 10 or frame 13. Let us assume the student chooses answer 13. He then depresses the forward control button 14 to energize relay A and to illuminate light 51 under forward control button 14. Relay A closes contact 51A of the holding circuit for forward control button 14, opens contact 53A to release the view button holding circuit and to relax relay L, and closes contact 56A to to engage forward clutch 56. With relay L returned to the relaxed position, blocking shutter relay 58 is energized blocking a portion of the film projected onto screen 8, as seen in FIG. 5. The student then turns the film advance knob 12 until the desired frame number appears in the frame registation box in an upper center portion of the screen 8. The student then depresses view button 11 to engage relay L, open contact 51L to relax relay A, close contact 53L to close the view button hold circuit, and open contact 58L to release the blocking shutter solenoid. By relaxing relay A, the forward clutch is disengaged. By depressing the viewing button 11, counter 16 is also actuated through a mechanical connection between view button 11 and counter button 55. Now assume that the student has chosen the wrong answer and frame 13 instructs him to return to frame 12. The student will depress reverse control button 15, energizing relay B to open contact 53B to relax relay L and thereby energize the blocking shutter solenoid 58 to block off the intelligence on the screen, close 52B to close the reverse control button holding circuit, and close contact 57B to engage reverse clutch 57, and energize the blocking shutter solenoid by relaxing relay L, to block off the intelligence on the screen. The student then turns the film advance knob until film number 12 appears in the frame registration box, and depresses view button 11 to disengage reverse clutch 57 and open the blocking shutter 58, as previously described.

It is noted that whenever any one of the control buttons, 11, 14 or 15 is depressed, the other two buttons are automatically assured of being in the open position, so that only one relay A, B, or L is energized at any given time. This feature insures the disengagement of the forward and reverse clutches when the view button is closed, and the closing of the blocking shutter when the forward or reverse control buttons are depressed.

One reason that forward and reverse clutches are provided is that during film advance operation, the diameters of the supply and take-up reels are constantly varying, thereby requiring that one gear or the other be in a free wheeling condition. Another reason is to prevent movement of the film when the view button is depressed or while the intelligence portion is being viewed.

The present machine is capable of presenting information and then requesting a subsequent answer by the learner. There may or may not be a variety of answers given for each question, with each one of the choices being a specific frame number.

The blocking shutter may be replaced by other means. For instance, the main illuminating source may be turned off and only a small portion of the film could be illuminated to indicate the film frame number. Several other arrangements could be substituted without varying from the scope of the present invention.

Another distinct advantage in the present invention is the lack of registration required between adjacent frames of the film. Since the film is advanced manually, the physical distance between adjacent films is of no significance.

What has been shown is an invention relating to a simplified teaching machine in which the learner has complete control of the device. The device utilizes a microfilm transport, rear screen projection, and novel shuttering arrangement. The microfilm strip is transported through the film gate with only the frame number being projected onto the screen. This machine offers an inexpensive method of teaching or presenting information to a learner without the necessity of complex circuitry and memory devices which entail high maintenance and high initial cost.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. A teaching machine including; a movable film including a series of adjacent frames; an optical projector to project light through said film; a viewing screen for receiving the projected image from said film; a manually operated mechanical linkage operatively connected to said film for transporting said film past said projected light; means for engaging and disengaging said mechanical linkage from said film; means including a shutter member for blocking out a portion of the image of said film from said viewing screen when said film is being transported between frames; a view control member for opening said shutter member, said view control member operatively connected to said means for engaging and disengaging said mechanical linkage from said film to disengage said mechanical linkage from said film when said shutter member is opened.

2. The apparatus according to claim 1 further including control means operatively connected to said means for engaging and disengaging said mechanical linkage from said film, said control means further operatively connected to said shutter member to close said shutter member when said means for engaging and disengaging is engaged.

3. The apparatus according to claim 2 wherein said mechanical linkage for transporting said film further includes a pair of film reel members, said reel members operatively coupled to said mechanical linkage by a first and second clutch member, said control means operatively connected to each of said clutch members, second control means including a forward and a reverse control member, said forward control member connected to said clutch members in such a manner as to engage said first clutch member while disengaging the second clutch member, said reverse control member connected to said second clutch member in such a manner as to engage the second clutch member and to disengage the first clutch member, both of said forward and reverse control members operatively connected to said shutter member in such a manner as to close said shutter.

4. The apparatus according to claim 3 whereby said view control member is operatively connected to both of said clutch members in such a manner as to disengage both of said clutch members when the control member opens said shutter.

5. The apparatus according to claim 4 further including means connected to said view control member for tallying the number of times said view control member is operated.

6. The method of operating a teaching machine including the steps of: projecting a predetermined series of successive film frames upon a viewing screen, each frame having an intelligence portion and a frame number portion; transporting said film from a first predetermined frame to another predetermined frame through a succession of intervening frames as directed by the intelligence contained on said first frame; blocking out the intelligence portion from said intervening frames and displaying the frame number portion while moving said film from the first to the other predetermined frame to prevent observation of the blocked out intelligence presented on said intervening frames; unblocking the blocked out portion of intelligence from said film when the other predetermined frame is projected upon said viewing screen to permit viewing of the other frame; and preventing movement of said film when the intelligence portion of a film frame is presented on the viewing screen.

References Cited in the file of this patent

UNITED STATES PATENTS

| | | |
|---|---|---|
| 2,030,175 | Le Fevre | Feb. 11, 1936 |
| 2,323,372 | Bryce | July 6, 1943 |
| 2,402,162 | Holt | June 18, 1946 |
| 3,052,041 | Luxton et al. | July 6, 1962 |
| 3,103,073 | Nickl et al. | Sept. 10, 1963 |

OTHER REFERENCES

Electronic Teaching Devices, Publication of RCA Laboratories, RCA TN No. 51, Dec. 2, 1957.